INVENTOR.
CHARLES JONES
BY Raymond P. Wallace

AGENT

United States Patent Office 3,400,692
Patented Sept. 10, 1968

3,400,692
HOUSING FOR INTERNAL COMBUSTION
ENGINES
Charles Jones, Hillsdale, N.J., assignor to Curtiss-Wright
Corporation, a corporation of Delaware
Filed Oct. 31, 1966, Ser. No. 590,982
10 Claims. (Cl. 123—8)

ABSTRACT OF THE DISCLOSURE

Resilient members of generally toroidal configuration are provided for a rotary engine housing subject to unequal axial expansion, the resilient toroidal members applying axial tension to a plurality of axially disposed housing members to hold the latter in tight assembly, responding resiliently to distribute unequal axial loads.

This invention relates to housings for internal combustion engines, especially trochoidal engines, and more particularly to housings and housing retaining means for air-cooled engines of the trochoidal type.

In water-cooled engines of the trochoidal type, wherein the housing or outer body of a single unit engine comprises basically a peripheral housing wall and a pair of parallel end walls, the peripheral wall may be made relatively thick and the end walls may be either bolted directly to it, or tied together by bolts passing through bores in the axial direction in the peripheral wall. The system is the same in water-cooled engines with coaxial plural units, wherein there are two or more coaxial peripheral walls, and one or more intermediate walls parallel to the end walls.

However, in air-cooled engines it is particularly desirable to make the peripheral wall as thin as possible, and to provide it with external cooling fins over which air is passed to carry away the heat. In such an arrangement the peripheral wall is not thick enough to hold bolts or bores, and in the prior art it has been customary to provide bores through the fins, externally to the shell of the peripheral wall, through which bores tie rods pass to hold the end walls. Such a construction is shown in Patent No. 3,240,423. This construction is thermodynamically undesirable, since for structural reasons the bolts or tie rods have to be as close as possible to the solid portion of the peripheral wall, causing the tie rods to lie near the bottom of the cooling passages between the fins; this positioning greatly disturbs the airflow over the fins with consequent loss of cooling efficiency.

The present invention solves this problem by providing a unique clamping arrangement of annular torsion boxes which abut the end walls and are held together by bolts or tie rods disposed outside the cooling fins, in such a manner that the torsion boxes apply axial pressure against the end walls in line with the solid portion of the peripheral wall to hold all parts of the housing together. The device of the invention has the added advantage that the torsion boxes are slightly resilient, permitting more axial expansion of the hotter portion of the housing than occurs in the cooler portion, and distributing the resulting strain more evenly.

It is therefore an object of this invention to provide an improved housing for internal combustion engines.

It is another object to provide an engine housing permitting distribution of strain resulting from uneven axial expansion.

A further object is to provide axial retaining means for air-cooled housings which permits optimum airflow.

Still another object is to provide means of applying axial retention pressure to a multipart housing from tie rods spaced outwardly therefrom.

Yet another object is to provide a torsion box clamping arrangement for engine housings.

Other objects and advantages of the invention will become apparent on reading the following specification in connection with the accompanying drawings, in which.

Figure 1:
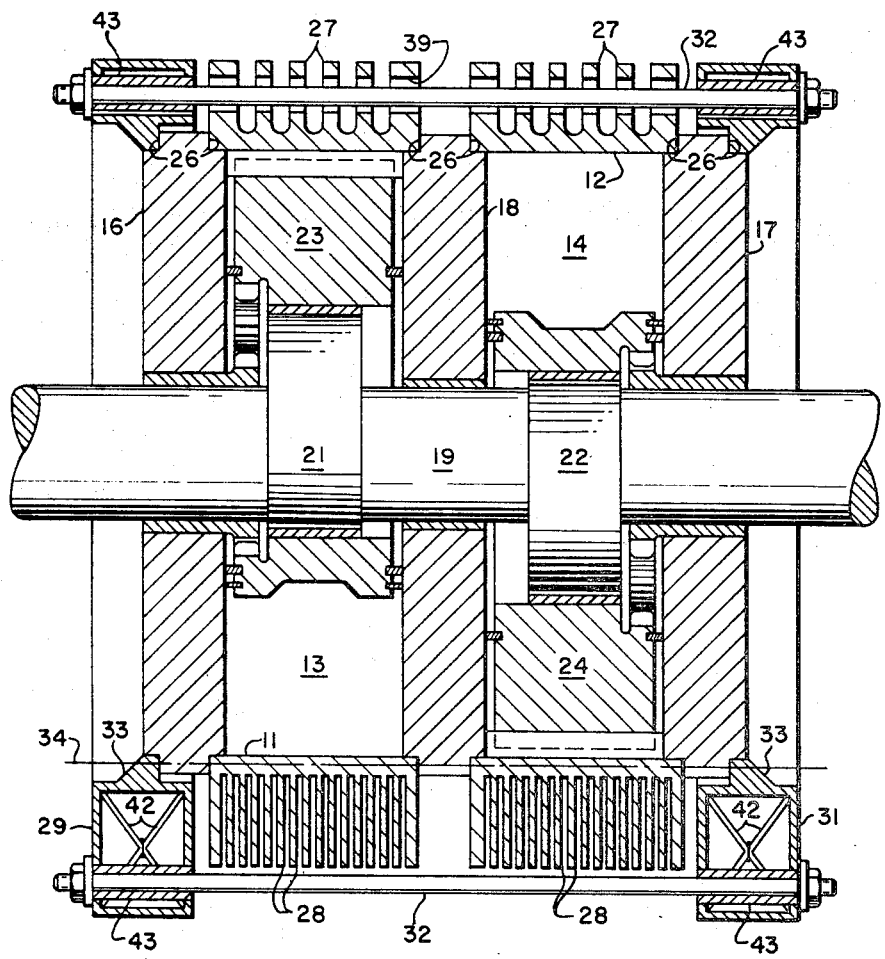
FIG. 1 is a cross-sectional elevation along the axis of a multiunit trochoidal engine.

In FIG. 1 there is shown a rotary combustion engine of trochoidal type. Two peripheral walls 11 and 12 having basically epitrochoidal inner surfaces define two internal cavities 13 and 14 in combination with a pair of end walls 16 and 17 and an intermediate wall 18 spaced midway between the end walls. A shaft 19 transpierces the end walls and the intermediate wall, and bears within each cavity an eccentric portion 21 and 22, on each of which ecentric portions is mounted a generally polygonal rotor 23 and 24 respectively. The usual gearing, gas and oil seals, apex seals, bearings, etc., are associated with the rotors and shaft, but being no part of the present invention require no further description here.

Intermediate wall 18 is shouldered by peripheral rabbets 26 on each side to receive the inwardly oriented ends of peripheral walls 11 and 12. End walls 16 and 17 have similar rabbets 26 on their inner sides to receive the outwardly directed ends of the peripheral walls, and on their outer sides to receive the torsion boxes later to be described. Rotors 23 and 24 are shown 180° apart in their respective cycles.

The peripheral walls 11 and 12 are provided with relatively heavy circumferentially oriented structural fins or ribs 27 in the general zone of low heat input to the engine, and with similarly oriented relatively thin cooling fins 28 in the zone of high heat input. Fins 27, having chiefly a structural function and little heat radiation, may be relatively low in radial height from the solid portion of the peripheral wall, but cooling fins 28 are much thinner and higher in order to provide sufficient surface for dissipation of the engine heat to cooling air. It will be noted that the solid thickness of the peripheral walls, between the inner surface and the fins, is approximately equal to the radial depth of rabbet grooves 26. The entire assembly thus far described is held together by torsion boxes 29 and 31, and tie rods 32.

Torsion boxes 29 and 31 are substantially mirror images of each other, and each comprises an approximately elliptical torus of generally rectangular cross-section, the proportions of which cross-section vary along the ellipse. The radially inner surface of each torsion box bears a pressure ring 33 which seats in the outermost rabbet groove 26 of each end wall.

Figure 2:
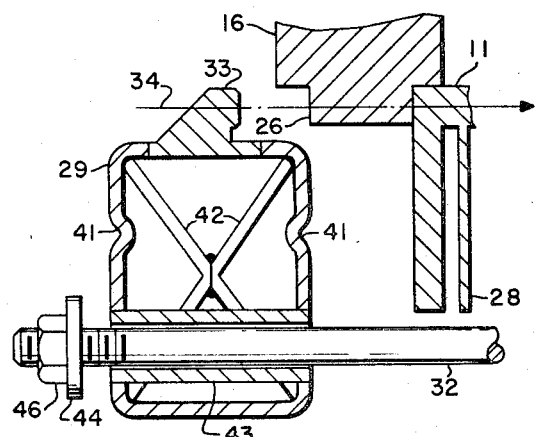
FIG. 2 is a fragmentary detail on an enlarged scale of the lower left corner of FIG. 1, partially disassembled.
Figure 3:
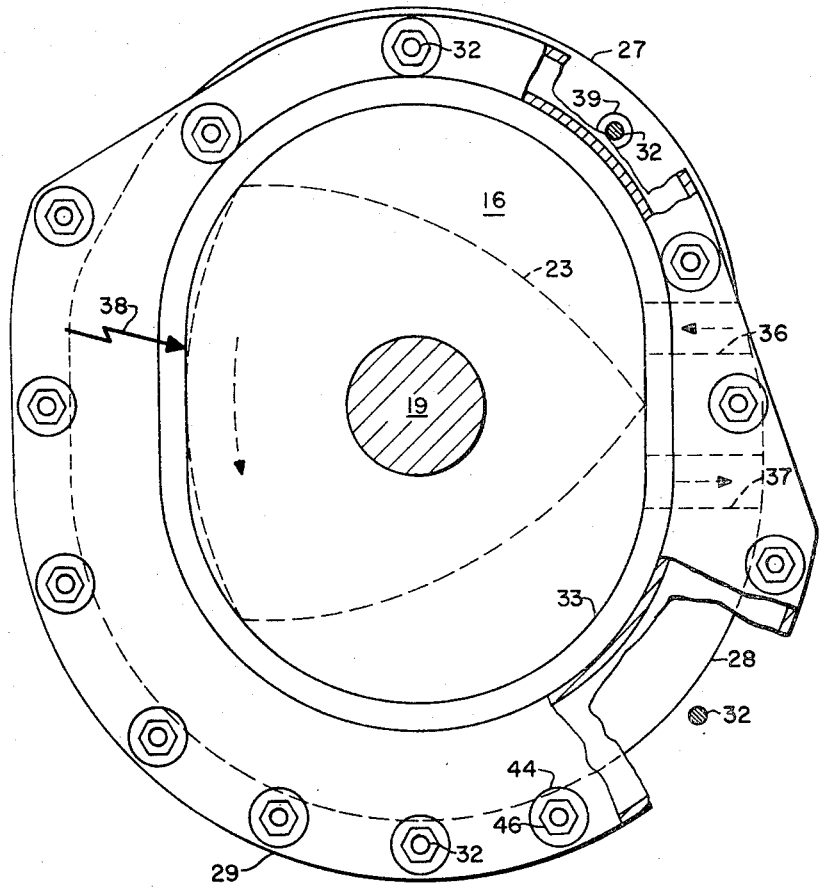
FIG. 3 is an end elevation of the engine of FIG. 1, with the torsion box clamping arrangement applied.

The general shape of the torsion boxes is shown in FIG. 3, with a detail in FIG. 2, the shape being dictated by the necessity of placing tie rods 32 outside the cooling fins in the hotter zone of the engine, while still applying axial clamping pressure to the assembly along the centerline 34 of the solid wall thickness of peripheral walls 11 and 12.

In FIG. 3 there is shown in dotted line the intake 36 for fuel-air mixture, the exhaust 37, and the sparkplug position schematically indicated by the zigzag arrow 38. A rotor 23 is shown in dotted line at the top dead center position, traveling in a counterclockwise direction. As shown in FIG. 3 the relatively cooler zone of the engine is at the top of the drawing, extending between the intake and the firing position which is just before top dead center. The external periphery of the engine is provided in this cooler zone with the structural ribs 27, and since the cooling air is not passed over these ribs they perform relatively little cooling function, and the tie rods 32 may pass through them through clearance bores 39, thus keeping the tie rods close to the solid portion of the peripheral walls.

The hot zone begins in the region of the firing position, just before top dead center in the direction of rotor travel, and continues around to the region of the exhaust port 37. The peripheral walls are provided in this hotter zone with higher, thinner cooling fins 28, and tie rods 32 are positioned radiallly outwardly therefrom in order not to interrupt or distort the flow of cooling air between the fins. Therefore, torsion boxes 29 and 31 extend farther radially outwardly in the hotter zone than in the cooler zone.

The general construction of the toroidal torsion boxes is shown in cross-section in FIG. 2. They may be castings in appropriate cases, or they may be made of metal plate material welded together in the desired form, or they may be of sheet metal as shown, formed into the approximately elliptical configuration with generally rectangular cross-section, and greater radial dimension at the hot zone of the engine. Steel is a suitable metal, but they may also be formed of titanium or other suitable material. Sheet metal may be dimpled, as shown at 41, for additional structural strength, and the torsion boxes may bear internal stiffening members 42. Stiffeners 42 may be continuous V-shaped channels extending all or part way around the torus and welded at their apexes to form an X-section, or they may be separate bends of sheet material or rods, appropriately spaced. At each tie rod location a tube 43 is installed in the torsion box, passing through the rectangular section in the axial direction to take the strain of the tie rod which passes through it, and firmly attached to the torsion box as by welding, soldering, or other convenient means. Tie rods 32 may have threaded ends, and be provided with washers 44 and nuts 46 of any convenient type to pull the tie rods tight and maintain the tension.

Rabbets 26 in the end walls have a radial depth approximately equal to the solid thickness of peripheral walls 11 and 12. Pressure rings 33, which may be welded or otherwise suitably attached to the inner diameter of the torsion boxes, are of appropriate dimensions to fit snugly into rabbets 26, thus applying axial pressure to the assembly along the midportion of the solid wall thickness of the peripheral housings, as shown by centerlines 34.

Although the construction of the torsion boxes is very strong and highly rigid, their form nevertheless provides a slight resilence, and under the full tension necessary to maintain the assembly secure and tight both in the cold state and under all operating conditions, the torsion boxes deflect slightly toward each other. For this reason, pressure rings 33 have the face mating with rabbets 26 slightly chamfered at the edges, to allow the slight rocking motion which may be generated by minute changes in angle.

It will be understood that the hot zone of the engine is subject to more thermal expansion than the cool zone, which may result in more axial growth of the hot portion of the engine than of the cooler portion. The torsion boxes are particularly useful in distributing the resulting strain. Since the torsion boxes have greater radial extent over the hot zone, they therefore have more resiliency in this portion, and any uneven axial growth of the engine causes greater deflection of the boxes at that portion, at the same time spreading the tension to adjacent tie rods. This construction and method of assembly thus allows dimensional change of the engine resulting from heating and cooling, particularly in localized zones, without causing any permanent distortion of the engine members.

Although the engine has been shown and described above in a two-unit embodiment, it will be understood that the present invention is equally applicable to single-unit engines, or to multiple engines of more than two units, and that various changes and modifications may be made without departing from the scope of the invention. It is intended to cover all such modifications in the following claims.

What is claimed is:

1. An internal combusion engine housing, comprising in combination at least one circumferential wall having a longitudinal axis, an end wall closing each end of said circumferential wall and defining an engine cavity therewith, portions of said housing being subject to unequal axial expansion, and axial clamping means comprising a generally annular resilient torus member disposed adjacent to each of the said end walls and having pressure-transmitting means in contact with each of said end walls near the periphery thereof and a plurality of tensioning means circumferentially spaced around said circumferential wall externally thereto and extending between said torus members, said tensioning means being adjustable to apply tension in the axial direction to said torus members and therethrough to said end walls and said circumferential wall to maintain all said walls in tight assembly, said torus members differentially deflecting at said portions of unequal axial expansion to resiliently distribute unequal tensions in said tensioning means over said pressure-transmitting means.

2. The combination recited in claim 1, wherein said circumferential wall is provided with circumferentially-oriented cooling fins on at least a portion of the exterior thereof, said torus members have a profile of greater radial extent in the portions generally congruent with said cooling fins, and said tensioning means are positioned radially outwardly of said fins.

3. The combination recited in claim 2, wherein said housing has during operation a relatively cool zone and a relatively hot zone, said cooling fins are disposed on said circumferential wall in said hot zone, said tensioning means are disposed close to said circumferential wall in said cool zone, said hot zone being subject to greater axial expansion during operation than said cool zone, said torus members having greater resiliency in the portions of their greater radial extent generally congruent with said hot zone to allow said greater axial expansion thereof.

4. The combination recited in claim 3, wherein said circumferential wall is provided in said cool zone with circumferentially oriented structural ribs on the exterior thereof, said structural ribs having bores therethrough close to said circumferential wall, and said tensioning means in said cool zone pass through said bores.

5. The combination recited in claim 1, wherein said engine housing has a plurality of axially-spaced circumferential walls and an intermediate wall disposed between each pair of adjacent circumferential walls, said intermediate wall closing the inwardly directed ends of the adjacent circumferential walls, said walls defining a plurality of coaxial engine cavities.

6. The combination recited in claim 1, wherein said torus members are generally annular hollow members having generally rectangular cross-section, each of said end walls has a peripheral rabbet on the external face thereof, said pressure-transmitting means borne by each said torus member has a face mating with its associated rabbet to apply pressure thereto, said mating face having its radially inner and radially outer circumferential corners chamfered to allow changes in angle due to deflection of the torus, each of said torus members have a plurality of circumferentially-spaced tubes near the periphery thereof and extending through said rectangular cross-section parallel to said axis, and said tensioning means are a plurality of tie rods, each of said tie rods having each of its ends extending through one of said tubes in oppositely disposed torus members, each of said tie rods having adjustable take-up means on at least one end external to said torus member to apply axial tension to said tie rod.

7. The combination recited in claim 6, wherein said rabbets have a radial depth approximately equal to the thickness of said circumferential wall and are congruent to said thickness, and said pressure-transmitting means exert axial pressure congruently with said thickness.

8. The combination recited in claim 7, wherein said engine housing has a plurality of said circumferential walls axially spaced, and an intermediate wall disposed between each pair of adjacent circumferential walls, said intermediate wall having on each side thereof a peripheral rabbet receiving the inwardly directed ends of its associated circumferential walls, said walls defining a plurality of coaxial engine cavities.

9. A torsion box for applying axial pressure to engine housings, comprising in combination a resilient generally annular hollow torus member having a generally rectangular cross section, said torus member having a longitudinal axis, said rectangular cross-section being formed of a pair of parallel end walls transverse to said axis connected by inner and outer circumferential walls extending in a direction parallel to said axis, and torus member in one portion of the annulus having its outer circumferential wall spaced farther radially outwardly from the inner circumferential wall than in the other portion of the annulus, said torus member having adjacent to its inner circumferential wall pressure-transmitting means for applying axial pressure to said engine housing and having circumferentially spaced around its outer periphery a plurality of connecting means for axial tensioning members, said torus cross-section being axially deflectable under high axial loading.

10. The combination recited in claim 9, wherein said pressure-transmitting means comprises a generally annular member having a pressure face adapted to mate with said engine housing, said mating face having its radially inner and radially outer circumferential corners chamfered to allow changes in angle due to deflection of the torus, and said connecting means comprises a plurality of tubes each extending through said rectangular cross-section to maintain the axial spacing of said torus end walls under axial loading.

References Cited
UNITED STATES PATENTS

| | | | |
|---|---|---|---|
| 1,260,860 | 3/1918 | Bie | 123—193 X |
| 3,193,187 | 7/1965 | Jones | 123—8 |

RALPH D. BLAKESLEE, *Primary Examiner.*